United States Patent
Ouchi

(10) Patent No.: US 8,174,626 B2
(45) Date of Patent: May 8, 2012

(54) APPARATUS AND METHOD FOR CORRECTING IMAGES DISPLAYED BY A PLURALITY OF IMAGE APPARATUS

(75) Inventor: Makoto Ouchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 684 days.

(21) Appl. No.: 12/245,155

(22) Filed: Oct. 3, 2008

(65) Prior Publication Data

US 2009/0096938 A1  Apr. 16, 2009

(30) Foreign Application Priority Data

Oct. 10, 2007  (JP) .................. 2007-264210

(51) Int. Cl.
- *H04N 17/00* (2006.01)
- *H04N 5/66* (2006.01)
- *H04N 3/22* (2006.01)
- *G03B 21/28* (2006.01)
- *G03B 21/14* (2006.01)

(52) U.S. Cl. .......... 348/745; 348/189; 348/383; 353/69; 353/94

(58) Field of Classification Search ............ 348/383, 348/189, 745, 36; 345/1.3; 353/69, 94
See application file for complete search history.

(56) References Cited

U.S. PATENT DOCUMENTS

| | | | |
|---|---|---|---|
| 5,396,257 A * | 3/1995 | Someya et al. ............ 345/1.1 |
| 5,805,117 A * | 9/1998 | Mazurek et al. ............ 345/1.3 |
| 6,188,454 B1 * | 2/2001 | Greene et al. ............ 349/74 |
| 6,219,011 B1 * | 4/2001 | Aloni et al. ............ 345/1.3 |
| 6,243,059 B1 * | 6/2001 | Greene et al. ............ 345/88 |
| 6,310,650 B1 * | 10/2001 | Johnson et al. ............ 348/383 |
| 6,404,456 B1 * | 6/2002 | Smith ............ 348/178 |
| 6,611,241 B1 * | 8/2003 | Firester et al. ............ 345/1.3 |
| 6,727,864 B1 * | 4/2004 | Johnson et al. ............ 345/1.3 |
| 7,038,727 B2 * | 5/2006 | Majumder et al. ............ 348/383 |
| 2002/0057361 A1 * | 5/2002 | Mayer, III et al. ............ 348/383 |
| 2004/0252228 A1 * | 12/2004 | Waki et al. ............ 348/383 |

FOREIGN PATENT DOCUMENTS

| | | |
|---|---|---|
| JP | A-2006-038976 | 2/2006 |
| JP | A-2006-153914 | 6/2006 |

* cited by examiner

Primary Examiner — Victor Kostak

(74) Attorney, Agent, or Firm — Oliff & Berridge, PLC

(57) ABSTRACT

An image correction apparatus that corrects images displayed by a plurality of image display apparatus, the images arranged contiguously or superimposed is disclosed. The image correction apparatus includes a correction reference value generator that generates a correction reference value common to the plurality of image display apparatus based on display characteristics of each of the image correction apparatus that form the plurality of image display apparatus, and a correction data generator that generates correction data for each of the image display apparatus, the correction data used to correct pixel values with reference to the correction reference value.

7 Claims, 14 Drawing Sheets

APPARATUS AND METHOD FOR CORRECTING IMAGES DISPLAYED BY A PLURALITY OF IMAGE APPARATUS

RELATED APPLICATIONS

This application claims priority to Japanese Patent Application No. 2007-264210 filed Oct. 10, 2007 which is hereby expressly incorporated by reference herein.

BACKGROUND

1. Technical Field

The present invention relates to an image correction apparatus, an image display system, and an image correction method.

2. Related Art

In recent years, high-performance image display apparatus, such as large-screen televisions and projectors, have achieved widespread use. In such image display apparatus, color reproducibility and image quality are considered more important. There is thus a strong market need for an image display apparatus that ensures "screen uniformity," in which a pixel having the same signal value is displayed with the same color at any position in a displayed image.

On the other hand, there is an image display system that uses a plurality of image display apparatus to arrange a plurality of images contiguously or superimpose a plurality of images. Such an image display system can express an impressively huge image or a multi-color image that cannot be expressed by a single image display apparatus. Color reproducibility and image quality are also important in the image display system that arranges a plurality of images contiguously or superimposes a plurality of images. Although there is a strong market need for an image display system that ensures the "screen uniformity" described above, ensuring the "screen uniformity" is difficult due to product-to-product variation of image display apparatus that display respective images.

As the technology for ensuring the "screen uniformity" described above, for example, JP-A-2006-38976 and JP-A-2006-153914 disclose technologies for correcting in-screen color non-uniformity.

JP-A-2006-38976 discloses a technology for preventing generation of color non-uniformity in every possible grayscale in input data. The technology allows data on the input-output characteristics of an image display apparatus to be measured and correction data for reducing the difference between the input-output characteristics data and reference input-output characteristics data to be determined for each grayscale level.

JP-A-2006-153914 discloses a technology for correcting illuminance non-uniformity including color non-uniformity and brightness non-uniformity. In the technology, a brightness non-uniformity correction pattern and a color non-uniformity correction pattern are used to create an illuminance non-uniformity correction pattern table for a plurality of illuminance levels. The table is used to reduce the amount of brightness non-uniformity generation and the amount of color non-uniformity generation to reduce the amount of illuminance non-uniformity generation.

JP-A-2006-38976 and JP-A-2006-153914 disclose technologies for correcting color non-uniformity in a single image produced by a single image display apparatus, but do not disclose technologies for correcting color non-uniformity when a plurality of images are arranged contiguously or superimposed. Therefore, the technologies disclosed in JP-A-2006-38976 and JP-A-2006-153914 cannot disadvantageously ensure "image quality uniformity" in an image display system that arranges a plurality of images contiguously or superimposes a plurality of images.

Further, the technologies disclosed in JP-A-2006-38976 and JP-A-2006-153914, when used to correct in-screen color non-uniformity produced by a single image display apparatus, have the following problem:

That is, when the technologies disclosed in JP-A-2006-38976 and JP-A-2006-153914 are used to correct signal values of pixels in accordance with correction data or a correction pattern, the corrected signal values may become larger than a limit value set in the image display apparatus (maximum pixel value, for example) in some cases. In this case, the correction of the signal values is insufficient, and another color non-uniformity problem disadvantageously occurs in an image produced by a single image display apparatus.

Therefore, in the technologies disclosed in JP-A-2006-38976 and JP-A-2006-153914, correction has to be made in such a way that corrected signal values do not exceed a limit value set in the image display apparatus. Therefore, the technologies disclosed in JP-A-2006-38976 and JP-A-2006-153914 cannot perfectly eliminate color non-uniformity even in an image produced by a single image display apparatus or cannot sufficiently ensure "screen uniformity."

Therefore, when the technologies disclosed in JP-A-2006-38976 and JP-A-2006-153914 are used to arrange a plurality of images contiguously or superimpose a plurality of images so as to display a single image, color non-uniformity disadvantageously occurs at boundaries between contiguous images or in the portion where images are superimposed.

SUMMARY

An advantage of some aspects of the invention is to provide an image correction apparatus, an image display system, and an image correction method that makes color non-uniformity less visible even when a plurality of images are arranged contiguously or superimposed to display a single image.

An image correction apparatus according to a first aspect of the invention corrects images displayed by a plurality of image display apparatus, the images arranged contiguously or superimposed, the image correction apparatus. The image correction apparatus includes a correction reference value generator that generates a correction reference value common to the plurality of image display apparatus based on display characteristics of each of the image correction apparatus that form the plurality of image display apparatus, and a correction data generator that generates correction data for each of the image display apparatus, the correction data used to correct pixel values with reference to the correction reference value.

According to the first aspect of the invention, since a correction reference value is determined in accordance with the display characteristics of a plurality of image display apparatus and correction data for correcting pixel values produced by each of the image display apparatus with reference to the correction reference value, color non-uniformity can be less visible even when a plurality of images are arranged contiguously or superimposed to display a single image. Further, the amount of correction to be made in each of the image display apparatus can be reduced as compared to a case where pixel values are corrected in each of the image display apparatus based on a fixed correction reference value determined in advance, whereby efficient correction can be made.

In the image correction apparatus according to the first aspect of the invention, it is preferable that the correction reference value generator can generate the correction reference value for each grayscale.

According to the image correction apparatus described above, since the correction reference value is generated for each grayscale, each of the image display apparatus can be finely corrected for each grayscale.

In the image correction apparatus according to the first aspect of the invention, it is preferable that the correction reference value may be the average of pixel values in the central positions in images displayed by the plurality of image correction apparatus.

According to the image correction apparatus described above, measured values of pre-captured images can be used to determine the correction reference value in a simple configuration.

An image display system according to a second aspect of the invention displays a plurality of images arranged contiguously or superimposed. The image display system includes any of the image correction apparatus described above, and a plurality of image display apparatus that display the plurality of images based on corrected pixel values obtained by using correction data generated by the image correction apparatus to correct the pixel values.

The second aspect of the invention can provide an image display system that makes color non-uniformity less visible even when a plurality of images are arranged contiguously or superimposed to display a single image.

In the image display system according to the second aspect of the invention, it is preferable that each of the image display apparatus includes an image processing apparatus that adjusts the amount of correction used to correct the pixel values. The image processing apparatus includes a correction amount generator that generates the amount of correction that corresponds to the pixel values, and a correction amount adjuster that adjusts the amount of correction in such a way that when corrected pixel values obtained by using the amount of correction to correct the pixel values are larger than a given maximum pixel value, the hue and chroma of the pixels that correspond to the corrected pixel values coincide with the hue and chroma determined from the correction reference value and the corrected pixel values are smaller than or equal to the maximum pixel value.

In the image display system described above, the amount of correction is adjusted in such a way that when corrected pixel values obtained by using the amount of correction to correct pixel values are larger than a given maximum pixel value, the hue and chroma of the pixels that correspond to the corrected pixel values coincide with the hue and chroma determined from the correction reference value and the corrected pixel values are smaller than or equal to the maximum pixel value. In this way, in addition to the above advantageous effect, when the corrected pixel values are larger than the maximum pixel value, it is possible to avoid a situation where the correction of a pixel signal becomes insufficient and new color non-uniformity occurs. Color non-uniformity can therefore be less visible even when the corrected pixel values are larger than a limit value set in the image display apparatus.

In the image display system according to the second aspect of the invention, it is preferable that the correction amount adjuster can adjust the amount of correction in such a way that when the corrected pixel value is larger than the maximum pixel value, the u' and v' components of the pixel in the u'-v' chromaticity diagram coincide with the u' and v' components determined from the correction reference value.

According to the image display system described above, in addition to the above advantageous effect, the u' the v' components in a chromaticity diagram typically used. Therefore, using existing resources, it is possible to provide an image display system that makes color non-uniformity less visible even when a corrected pixel value is larger than a limit value set in an image processing apparatus.

An image correction method according to a third aspect of the invention corrects images displayed by a plurality of image display apparatus, the images arranged contiguously or superimposed. The image correction method includes generating a correction reference value common to the plurality of image display apparatus based on display characteristics of each of the image correction apparatus that form the plurality of image display apparatus, and generating correction data for each of the image display apparatus, the correction data used to correct a pixel value with reference to the correction reference value.

The third aspect of the invention can provide an image correction method that makes color non-uniformity less visible even when a plurality of images are arranged contiguously or superimposed to display a single image.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Embodiments of the invention will be described below in detail with reference to the drawings. The embodiments described below are not intended to inappropriately limit the contents of the invention set forth in the claims. Further, all the configurations described below are not necessarily essential in the invention.

1. Image Display System

An image correction apparatus according to the embodiment of the invention is applied to an image display system that displays a plurality of images by arranging them contiguously or superimposing them. The image correction apparatus produces correction data used to correct images (image signals) produced by image display apparatus that form the image display system and display images, and supplies the correction data to each of the image display apparatus.

Figure 1:
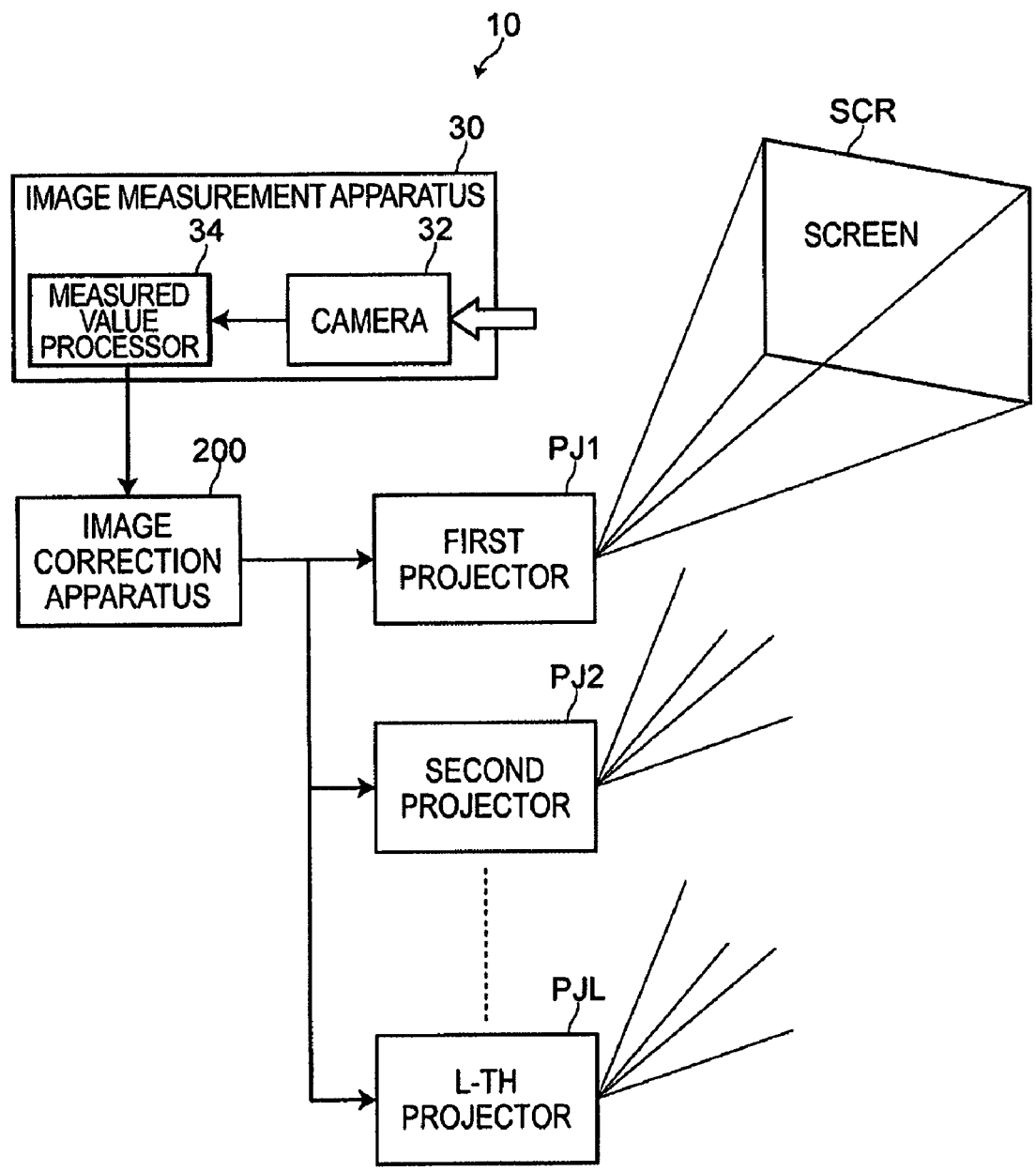
FIG. 1 is a block diagram of an exemplary configuration of an image display system according to an embodiment of the invention.

FIG. 1 shows a block diagram of an exemplary configuration of an image display system according to the present embodiment.

An image display system 10 includes a first projector PJ1 to an L-th projector PJL (L is an integer greater than or equal to 2), an image measurement apparatus 30 for acquiring measured values from images projected by the first projector PJ1 to the L-th projector PJL, and an image correction apparatus 200. The image display system 10 may further include an image input unit (not shown) that inputs image signals to the first projector PJ1 to the L-th projector PJL.

The first projector PJ1 to the L-th projector PJL project images onto a screen SCR and arrange the projected images contiguously or superimpose the projected images to display a single image on the screen SCR. For example, when a plurality of projected images arranged contiguously are displayed on the screen SCR, the images may be arranged contiguously only in the horizontal or vertical direction, or in both the horizontal and vertical directions.

The first projector PJ1 to the L-th projector PJL may have the same configuration or may have different specifications. The following description will be made with reference to a case where the first projector PJ1 to the L-th projector PJL have the same configuration.

Figure 2:
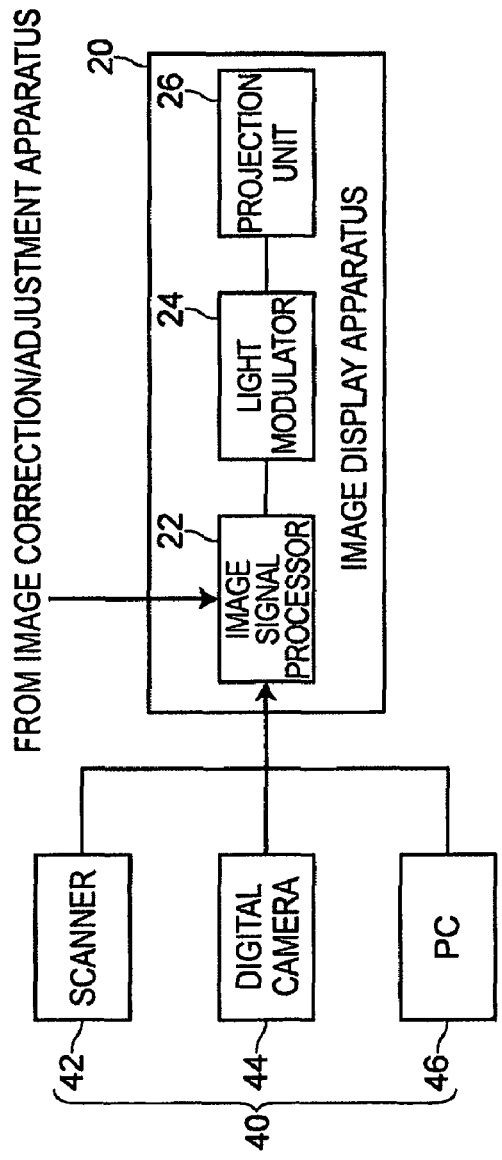
FIG. 2 is a block diagram of an exemplary configuration of an image display apparatus applied to each of first to L-th projectors shown in FIG. 1.

FIG. 2 is a block diagram of an exemplary configuration of an image display apparatus applied to each of the first projector PJ1 to the L-th projector PJL shown in FIG. 1. FIG. 2 also shows an image input section 40 that supplies an image signal to the image display apparatus 20.

The image display apparatus 20 includes an image signal processor 22, a light modulator 24, and a light projection unit 26. The image signal processor 22 receives an image signal inputted from the image input section 40. The image signal processor 22 then adjusts the amount of correction for the image signal within the range of displayable (processable) values in the image display apparatus 20 based on correction data from the image correction apparatus 200, and corrects the image signal based on the amount of correction. The light modulator 24 is irradiated with light from a light source (not shown), and modulates light passage rate (transmittance, modulation rate) for each pixel based on the image signal from the image signal processor 22. As the light modulator 24, a light valve formed of a liquid crystal panel is employed. A liquid crystal panel is obtained by encapsulating and sealing liquid crystal molecules, which are electro-optic substances, between a pair of transparent glass substrates. For example, a polysilicon TFT is used as a switching device to modulate the light passage rate for each pixel in accordance with the image signal from the image signal processor 22. The light projection unit 26 includes a projection optical system that projects the light from the light source modulated by the light modulator 24 onto the screen SCR.

The image input section 40 produces an image signal representing an image to be projected by a projector. As the image input section 40, any of a scanner 42, a digital camera 44, and a personal computer (PC) 46 is employed.

The image measurement apparatus 30 includes a camera 32 as an imager and a measured value processor 34. The camera 32 captures an image on the screen SCR projected by the image display apparatus 20 to acquire image data of the projected image. An example of the camera 32 to be employed may be a digital still camera. The measured value processor 34 produces measured values based on the image data acquired by the camera 32. The measured values produced by the image measurement apparatus 30 are supplied as measured data to the image correction apparatus 200.

2. Image Correction Apparatus

Figure 3:
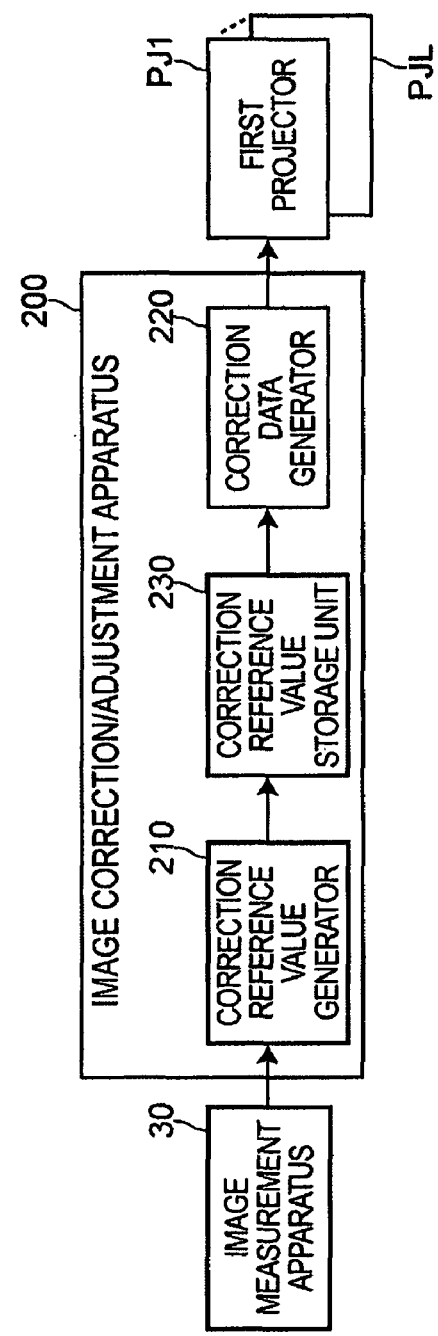
FIG. 3 is a block diagram of an exemplary configuration of an image correction apparatus shown in FIG. 1.

FIG. 3 is a block diagram of an exemplary configuration of the image correction apparatus 200 shown in FIG. 1.

The image correction apparatus 200 receives measured data (measured values) from the image measurement apparatus 30 as a whole measured data input unit, and uses the measured data to produce correction reference values according to the display characteristics of each of the first projector PJ1 to the L-th projector PJL. The image correction apparatus 200 then produces correction data used to correct an image signal (pixel values) from the image input section 40 with reference to the correction reference values. The correction data are supplied to each of the first projector PJ1 to the L-th projector PJL.

In the present embodiment, the display characteristics of each of the projectors are obtained by acquiring the pixel values of the pixels, as measured values, in an image projected by the projector. In the present embodiment, for example, a measured value of each pixel in the projected image is obtained for each grayscale as the display characteristics of each of the projectors.

That is, the image correction apparatus 200 uses measured data of an image projected by each of the projectors to determine correction reference values based on the display characteristics of the projector, produces correction data specific to the projector based on the correction reference values, and supplies them to the projector. In this way, the amount of correction to be made in each of the projectors can be reduced as compared to a case where an image signal is corrected in each of the projectors based on fixed correction reference values determined in advance, whereby efficient correction can be made.

The image correction apparatus 200 may include a correction reference value generator 210 and a correction data generator 220. The correction reference value generator 210 generates correction reference values based on the display characteristics of each of the image display apparatus, which are a plurality of projectors (image display apparatus). More specifically, the correction reference value generator 210 generates a correction reference value for each grayscale. The correction data generator 220 generates correction data used to correct a pixel value with reference to each correction reference value for each of the image display apparatus.

The image correction apparatus 200 may further include a correction reference value storage unit 230. In this case, the correction reference value storage unit 230 stores correction reference values generated by the correction reference value generator 210. The correction data generator 220 reads correction reference values stored in the correction reference value storage unit 230 and generates correction data based on the correction reference values.

As described above, the image display system 10 in the present embodiment may include the image correction apparatus 200 and a plurality of projectors (image display apparatus) that display a plurality of images based on pixel values corrected by using correction data from the image correction apparatus 200.

Figure 4:
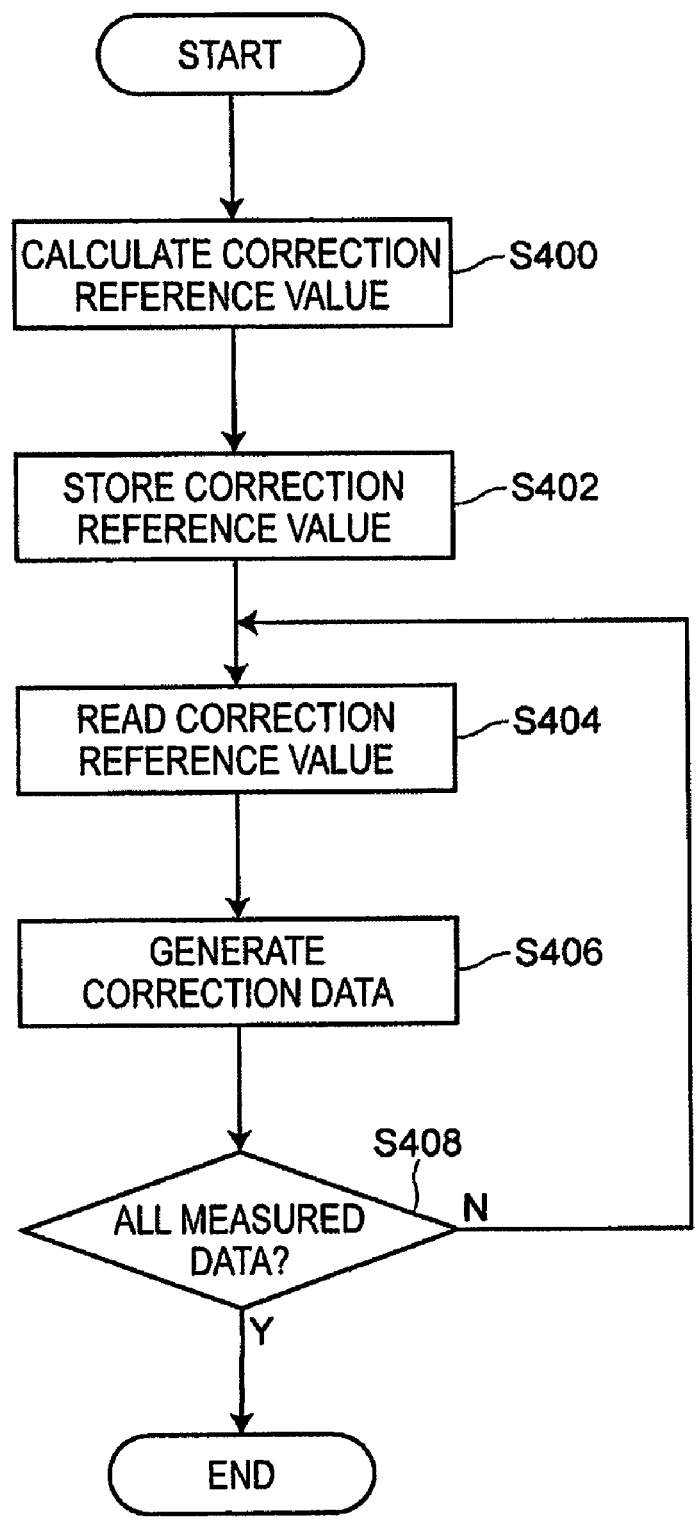
FIG. 4 is a flowchart showing exemplary processes performed by the image correction apparatus in the present embodiment.

FIG. 4 is a flowchart showing exemplary processes performed by the image correction apparatus 200 in the present embodiment. The image correction apparatus 200 includes a central processing unit (CPU) and a memory (not shown), and the CPU reads a program stored in the memory and executes the following processes:

First, the image correction apparatus 200 acquires measured data (measured values) from the image measurement apparatus 30, and the correction reference value generator 210 determines correction reference values according to the display characteristics of each of the projectors (step S400). More specifically, the correction reference value generator 210 uses groups of measured values in an image produced by each of the projectors to generate a correction reference values common to the projectors for each grayscale. For example, the correction reference value generate 210 can determine, as a correction reference value, the average of measured values of all pixels in L images projected by the first projector PJ1 to the L-th projector PJL.

The image correction apparatus 200 then stores the correction reference value for each grayscale determined in the step S400 in the correction reference value storage unit 230 (step S402).

The correction data generator 220 in the image correction apparatus 200 then reads the correction reference values from the correction reference value storage unit 230 (step S404), and uses the correction reference values as a reference to generate correction data that correspond to the amount of correction for the measured values from each of the projectors (step S406). When correction data have not yet been generated for all measured data (step S408: N), the control returns to the step S404. On the other hand, when correction data have been generated for all measured data (step S408: Y), the series of processes are terminated (END).

As described above, an image correction method for correcting images produced by a plurality of image display apparatus that display images by arranging them contiguously or superimposing them may include a correction reference value generating step of generating correction reference values based on the display characteristics of each of the plurality of image display apparatus, and a correction data generating step of generating correction data for correcting pixel values with reference to the correction reference values.

The correction data to be generated as described above are generated for each of the first projector PJ1 to the L-th projector PJL and supplied to the projector. Each of the projectors stores the correction data and displays an image using an image signal corrected based on the correction data.

3. Image Processing Using Correction Data

A detailed description will be made of the image signal processor 22 in the image display apparatus 20 that corrects an image signal based on correction data from the image correction apparatus 200 in the present embodiment.

Figure 5:
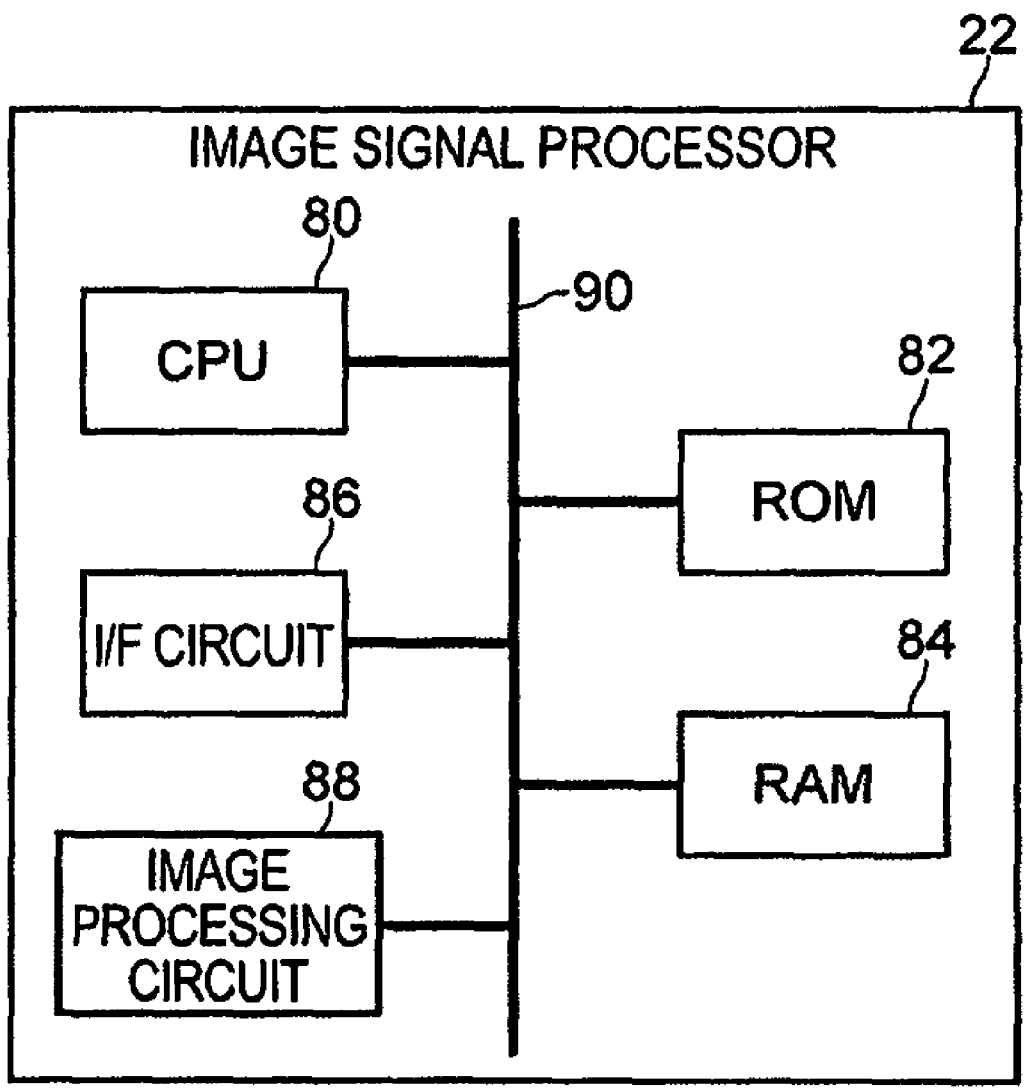
FIG. 5 is a block diagram showing an exemplary hardware configuration of an image signal processor 22 shown in FIG. 2.

FIG. 5 is a block diagram showing an exemplary hardware configuration of the image signal processor 22 shown in FIG. 2. In FIG. 5, the same portions as those in FIG. 2 have the same reference characters and description thereof will be omitted as appropriate.

The image signal processor 22 includes a CPU 80, a read only memory (ROM) 82, a random access memory (RAM) 84, an interface (I/F) circuit 86, and an image processing circuit 88. The CPU 80, the ROM 82, the RAM 84, the I/F circuit 86, and the image processing circuit 88 are connected to one another via a bus 90.

The ROM 82 stores a program, and the CPU 80 can read the program via the bus 90 and carry out processes that correspond to the program. The RAM 84 may become a working memory for the CPU 80 when it carries out processes, and may temporarily store a program read by the CPU 80. The I/F circuit 86 interfaces with the image input unit 40 and, for example, inputs an image signal from the image input unit 40. The image processing circuit 88 performs image processing in the present embodiment. The image processing circuit 88, for example, refers to the program and data stored in the ROM 82, and uses the RAM 84 as a working memory to perform image processing in the present embodiment.

For example, when a projector is inspected before shipping, correction data are generated in the image correction apparatus 200. The correction data is written as measured values to the ROM 82 or the RAN 84 when the projector is shipped or initiated to operate. The image processing circuit 88 corrects an image signal from the image input section 40 via the I/F circuit 86 to reduce in-screen color non-uniformity. In the image signal processor 22, although the description has been made of the case where the image processing circuit 88 is dedicated hardware prepared separately from the CPU 80, the function of the image processing circuit 88 may be achieved in the form of processes carried out by the CPU 80 that has read the program stored in the ROM 82 or the RAM 84.

The image processing circuit (image processing apparatus in a broad sense) 88 adjusts the amount of correction for an image signal within the range of displayable values in the image display apparatus, and uses the image signal corrected by using the amount of correction to display an image. Color non-uniformity in the display screen is thus reduced. More specifically, when the corrected image signal is not within the range of displayable values in the image display apparatus, the amount of correction is adjusted within the range of displayable values in the image display apparatus in such a way that reduction in lightness (brightness) of a pixel of interest is tolerated, whereas the hue and chroma of the pixel coincide with the hue and chroma determined from the reference correction values described above.

Therefore, in the image display system 10 shown in FIG. 1, each of the projectors first projects an image for evaluation onto the screen SCR. The image measurement apparatus 30 captures the projected image on the screen SCR as image data and produces measured values. The projection performed by each of the projectors and the imaging performed by the image measurement apparatus are repeated, and the image measurement apparatus 30 produces measured values that correspond to all the pixel values of each of all the pixels in the image projected by the projector. The measured values produced by the image measurement apparatus 30 are supplied as measured data to the image correction apparatus 200.

The image correction apparatus 200 uses all the measured values (measured data) to determine reference correction values, and produces correction data specific to each of the projectors with reference to the reference correction values as described above. The correction data are written to the ROM 82 or the RAM 84 when the projector is shipped or initiated to operate. When an image signal that corresponds to an image from the image input unit 40 is inputted, the projector determines the amount of correction for each pixel based on the correction data written to the ROM 82 or the RAM 84, and uses the image signal corrected by using the amount of correction to project an image onto the screen SCR.

In this process, the corrected image signal may be out of the range of displayable values in the projector in some cases. For example, when the image signal is a signal in the RGB space and the number of bits of each pixel value expressed by the image signal from the image input unit 40 is "8," the pixel value expressed by the corrected image signal may be larger than "255" in some cases, which is the maximum pixel value that can be expressed by 8 bits. In such a case, the image signal cannot be corrected anymore. To address the problem, in the present embodiment, when the corrected image signal is not within the range of displayable values in the projector, the amount of correction is adjusted in such a way that reduction in lightness is tolerated, whereas the hue and chroma of the pixel of interest coincide with the hue and chroma in a reference position in the screen.

In this way, color difference after the image signal has been corrected can be significantly smaller than lightness difference, whereby in-screen color non-uniformity can be reduced.

3.1 Image Processing Apparatus

Figure 6:
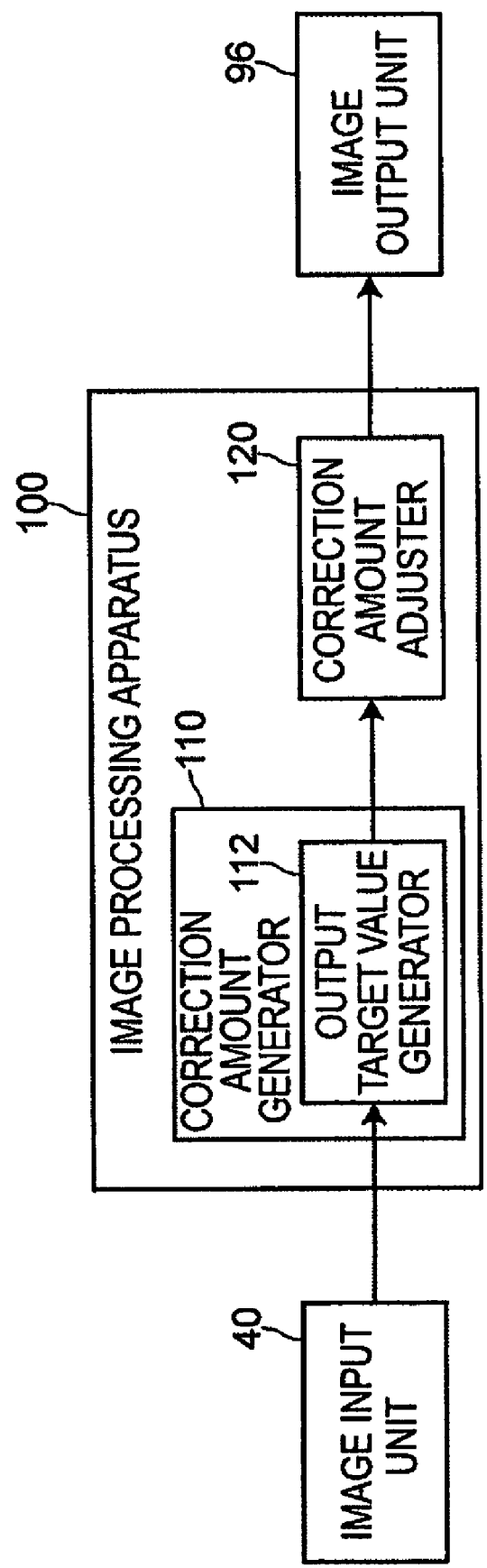
FIG. 6 is a block diagram showing an exemplary configuration of an image processing apparatus according to an embodiment of the invention.

An image processing apparatus applicable to the image signal processor 22 described above can be configured as follows:

FIG. 6 is a block diagram showing an exemplary configuration of an image processing apparatus according to an embodiment of the invention.

An image processing apparatus 100 in the present embodiment receives an image signal inputted from the image input section 40 shown in FIG. 2. The amount of correction used to correct the pixel value of each pixel expressed by the image signal is then adjusted. The amount of correction is used to correct original pixel values by image signal processing (not shown), and an image signal having the corrected pixel values is outputted to an image output unit 96, such as any of the projectors shown in FIG. 1.

The image processing apparatus 100 includes a correction amount generator 110 and a correction amount adjuster 120. The correction amount generator 110 generates the amount of correction that corresponds to a pixel value expressed by the image signal. The correction amount adjuster 120 uses the amount of correction generated by the correction amount generator 110 to adjust the amount of correction in such a way that, when the corrected pixel value obtained by correcting the pixel value described above is larger than a given maximum pixel value, the hue and chroma of the pixel that corresponds to the corrected pixel value described above coincide with the hue and chroma determined from the reference correction values described above, and the corrected pixel value is smaller than or equal to the maximum pixel value.

That is, an image processing method for adjusting the amount of correction used to correct a pixel value may include a correction amount generating step of generating the amount of correction that corresponds to the pixel value, and a correction amount adjusting step of adjusting the amount of correction in such a way that, when a corrected pixel value obtained by using the amount of correction to correct the pixel value is larger than a given maximum pixel value, the hue and chroma of the pixel that corresponds to the corrected pixel value coincide with the hue and chroma determined from the reference correction values described above.

In this way, when a corrected pixel value is larger than a maximum pixel value, it is possible to avoid a situation where the correction of a pixel signal becomes insufficient and new color non-uniformity occurs. Color non-uniformity can therefore be less visible even when the corrected pixel value is larger than a limit value set in the image display apparatus.

For example, when the number of bits of a pixel value is "8," the maximum pixel value is "255," which is the value that can be expressed in 8 bits. The invention is not, however, limited by the number of bits used to express a pixel value. The maximum pixel value may alternatively be set irrespective of the number of bits used to express a pixel value.

The image processing apparatus 100 may further include an output target value generator 112 that generates an output target value determined from a reference correction value described above, and the correction amount generator 110 may use an output target value to generate the amount of correction. It is noted that the output target value generator 112 may be newly added to the correction amount generator 110 and the correction amount adjuster 120, or the output target value generator 112 may be included in the correction amount generator 110 or the correction amount adjuster 120. In FIG. 6, the correction amount generator 110 includes the output target value generator 112.

Providing the output target value generator 112 allows the amount of correction that will be adjusted by the image processing apparatus 100 to be produced based on an output target value determined in consideration of measured values, whereby the amount of correction can be generated in accordance with the measured values. Further, since the correction is made by using a correction reference value common to the projectors as the output target value, color non-uniformity can be less visible even when a plurality of images are arranged contiguously or superimposed for display. It is therefore possible to provide an image processing apparatus that produces the amount of correction in consideration of manufacturing variation to adjust the amount of correction in such a way that product-to-product variation is absorbed.

3.2 Exemplary Configuration

An exemplary configuration of the image processing apparatus 100 in the present embodiment will be described below.

Figure 7:
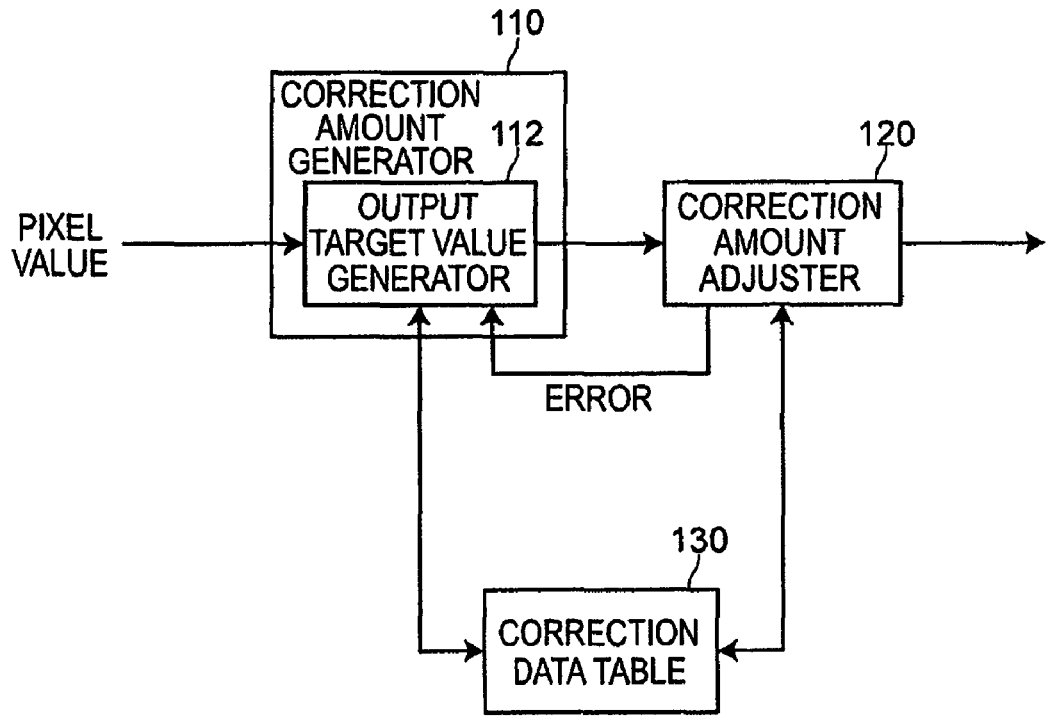
FIG. 7 is a block diagram showing an exemplary key configuration of the image processing apparatus in the present embodiment.

FIG. 7 is a block diagram showing an exemplary key configuration of the image processing apparatus 100 in the present embodiment. In FIG. 7, the same portions as those in FIG. 6 have the same reference characters and description thereof will be omitted as appropriate. In FIG. 7, the image processing apparatus 100 shown in FIG. 6 further includes a correction data table 130 in addition to the correction amount generator 110 and the correction amount adjuster 120. The function of the correction data table 130 may be performed by a memory provided external to the image processing apparatus 100 (the ROM 82 in FIG. 5, for example).

The correction data table (table in a broad sense) 130 stores correction data (measured values) for the pixels displayed based on pixel values of all pixels in an image. Correction data produced with reference to correction reference values are also stored. Therefore, the correction data table 130 stores correction data (measured values) for each grayscale that are determined from the reference correction values and correction data (measured values) for the pixels displayed based on their pixel values. It is noted that the correction data table 130 may store measured values instead of correction data. In this case, in the following description, the words "correction data" may be replaced with the words "measured values."

Figure 8:
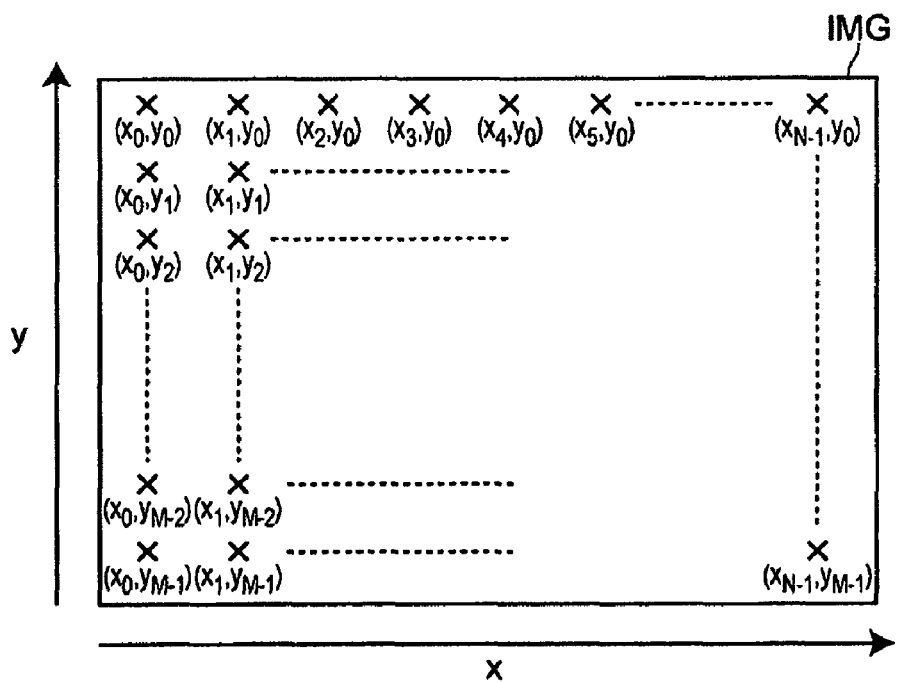
FIG. 8 explains pixel positions in an image from which correction data in a correction data table shown in FIG. 7 are produced.

FIG. 8 explains pixel positions in an image from which correction data in the correction data table 130 shown in FIG. 7 are produced. In FIG. 8, for example, the x axis is oriented in the horizontal direction and the y axis is oriented in the vertical direction in an image IMG projected by a projector. The positions of all pixels in the image IMG can thus be defined. It is assumed in the following description that N (N is an integer greater than or equal to two) pixels are arranged in the horizontal direction and M (M is an integer greater than or equal to two) pixels are arranged in the vertical direction. Therefore, the correction data table 130 stores correction data based on measured values measured by the image measurement apparatus 30 for the pixels $(x_0, y_0), (x_1, y_0), \ldots, (x_{N-1}, y_0), (x_0, y_1), \ldots, (x_0, y_2), \ldots, (x_0, y_{M-1}), \ldots, (x_{N-1}, y_{M-1})$ in the image ING.

Figure 9:
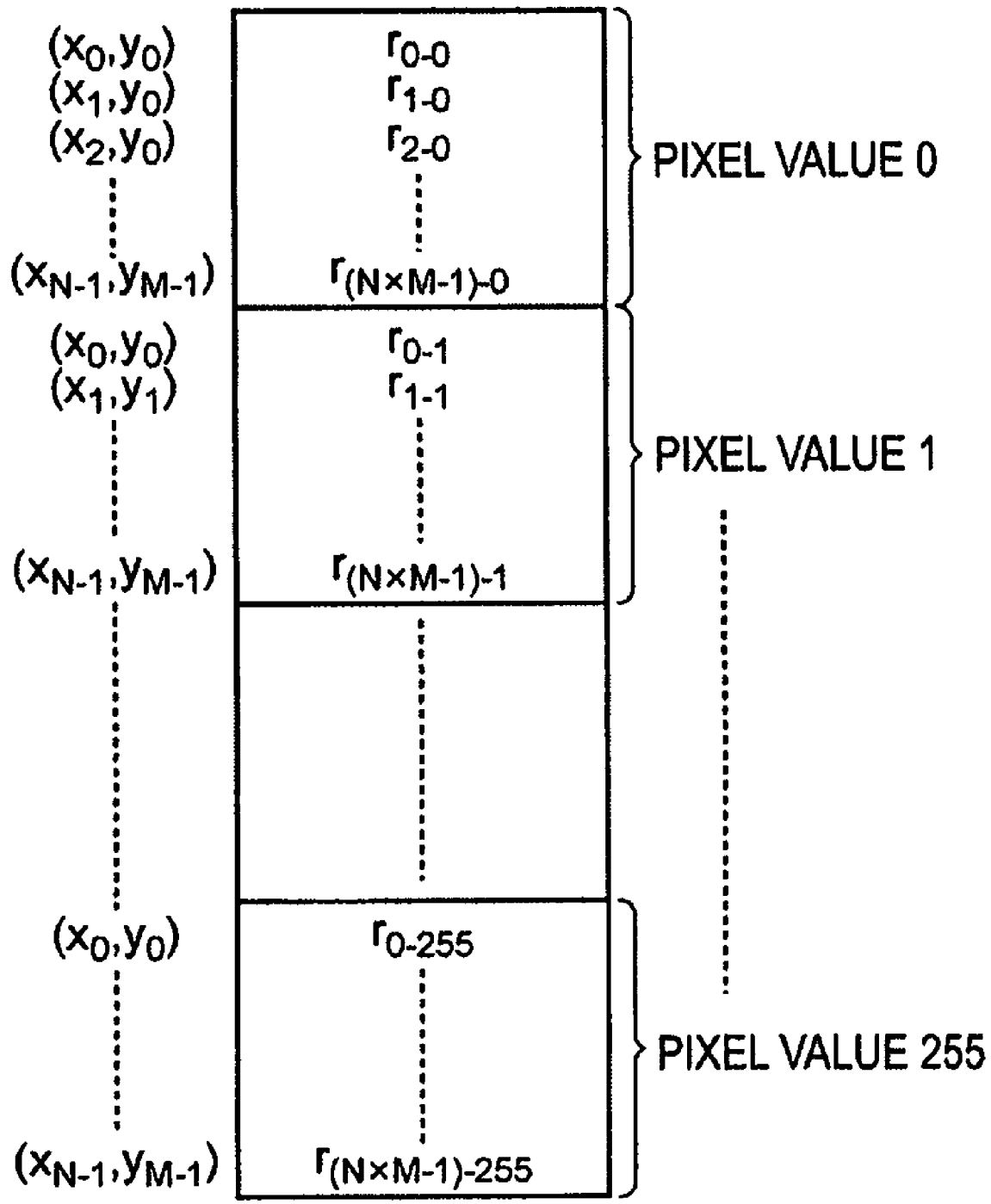
FIG. 9 explains correction data stored in the correction data table shown in FIG. 7.

FIG. 9 explains correction data stored in the correction data table 130 shown in FIG. 7.

The correction data table 130 first stores correction data that correspond to measured values of the pixels displayed based on the pixel value "0," for example, in the order of $(x_0, y_0), (x_1, y_0), (x_2, y_0), \ldots, (x_{N-1}, y_0), (x_0, y_1), \ldots, (x_{N-1}, y_{M-1})$ in the horizontal direction of the image IMG shown in FIG. 8. The correction data table 130 then stores correction data that correspond to measured values of the pixels displayed based on the pixel value "1" in the order of $(x_0, y_0), (x_1, y_0), \ldots, (x_2, y_0), \ldots, (x_{N-1}, y_0), (x_0, y_1), \ldots, (x_{N-1}, y_{M-1})$ in the horizontal direction of the image ING shown in FIG. 8. Finally, the correction data table 130 stores correction data that correspond to measured values of the pixels displayed based on the pixel value "255" in the order of $(x_0, y_0), (x_1, y_0), (X_2, y_0), \ldots, (x_{N-1}, y_0), (x_0, y_1), \ldots, (x_{N-1}, y_{M-1})$ in the horizontal direction of the image IMS shown in FIG. 8. As a result, for all the pixels in an image, the correction data table 130 stores correction data that correspond to measured values of the pixels displayed based on their pixel values.

In FIG. 9, the data size of correction data stored in the correction data table 130 for each pixel value and data size of individual correction data are known in advance. Therefore, among the groups of correction data stored in the correction data table 130, it is possible to identify the area where the correction data for a desired pixel value in a desired pixel position is stored. The correction data table 130 may therefore store only correction data.

As shown in FIG. 7, more specifically, the output target value generator 112 uses the table that stores correction data (measured values) determined from the reference correction values described above to generate correction data, as an output target value, which corresponds to the pixel value of the pixel of interest, and the correction amount adjuster 120 can adjust the amount of correction for the pixel of interest in such a way that, when the table that stores correction data of the pixel of interest displayed based on each of the pixel values for the pixel stores no measured value that corresponds to the output target value, the hue and chroma of the pixel of interest coincide with the hue and chroma determined from the reference correction values.

That is, referring to the correction data table 130 described above, the output target value generator 112 (correction amount generator 110) produces correction data, as an output target value, determined from the reference correction value described above based on the same pixel value as the pixel value of the pixel of interest. When the correction amount adjuster 120 searches the correction data table 130 and detects that the correction data table 130 stores correction data that correspond to the output target value, the correction amount adjuster 120 generates the amount of correction based on the correction data that corresponds to the output target value and outputs the generated correction data. On the other hand, when the correction amount adjuster 120 searches the correction data table 130 and detects that the correction data table 130 stores no correction data that correspond to the output target value, the correction amount adjuster 120 adjusts the amount of correction for the pixel of interest in such a way that the hue and chroma of the pixel of interest coincide with the hue and chroma determined from the reference correction values described above. Therefore, the image processing apparatus 100 can adjust the amount of correction within the range of displayable values in an image display apparatus in such a way that reduction in lightness (brightness) of a pixel of interest is tolerated, whereas the hue and chroma of the pixel coincide with the hue and chroma determined from the reference correction values described above.

In this way, an output target value is produced by referring to the table that stores correction data determined from the reference correction values in the present embodiment, and judging whether or not correction data that correspond to the output target value is stored in the table that stores correction data for the pixel of interest allows judgment of whether or not the corrected pixel value obtained by using the amount of correction to correct the pixel value of the pixel of interest is larger than a maximum pixel value. Therefore, a simple configuration can be used to judge whether or not the corrected pixel value of the pixel of interest is larger than a maximum pixel value without adding a new apparatus.

3.3 Exemplary Processes

Exemplary processes carried out by the image processing apparatus 100 in the present embodiment will be described below. The following description will be made of a case where the image processing apparatus 100 in the present embodiment adjusts the amount of correction for the pixel value for each color component in the RGB color space, but the invention is not limited thereto.

In the present embodiment, as will be described later, when a corrected pixel value is larger than a maximum pixel value, the amount of correction is adjusted in such a way that the u' and v' components of the pixel of interest in the u'-v' chromaticity diagram coincide with the u' and v' components determined from reference correction values in the present embodiment. By thus using the u' the v' components in a chromaticity diagram typically used, a simple configuration can be used to adjust the amount of correction for the pixel of interest in such a way that the hue and chroma of the pixel of interest coincide with the hue and chroma determined from reference correction values in the present embodiment. Therefore, using existing resources, it is possible to provide an image processing apparatus that makes color non-uniformity less visible even when a corrected pixel value is larger than a limit value set in an image processing apparatus.

In the present embodiment, as will be described in the following sections, for the pixel value for each color component in the RGB space, the amount of correction is adjusted by lowering an output target value in such a way that a corrected pixel value does not exceed a maximum pixel value.

Figure 10:
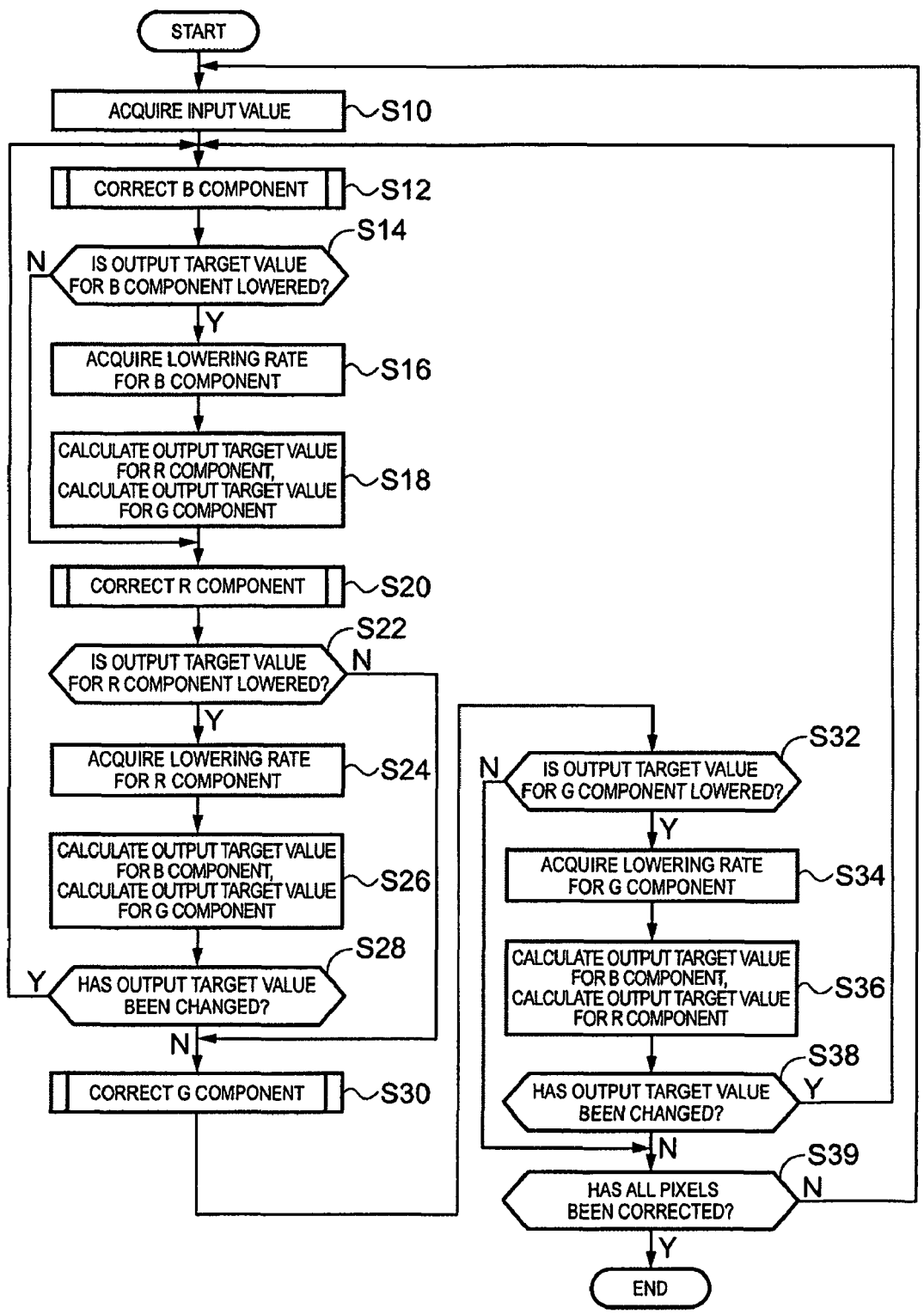
FIG. 10 is a flowchart of exemplary processes carried out by the image processing apparatus in the present embodiment.

FIG. 10 is a flowchart of exemplary processes carried out by the image processing apparatus 100 in the present embodiment.

For example, the ROM 82 stores in advance a program for carrying out the processes shown in FIG. 10. The image processing circuit 88 including the CPU 80 or a CPU (not shown) reads the program stored in the ROM 82 and carries out processes that correspond to the program. In this way, the processes shown in FIG. 10 can be carried out by software.

Figure 11:
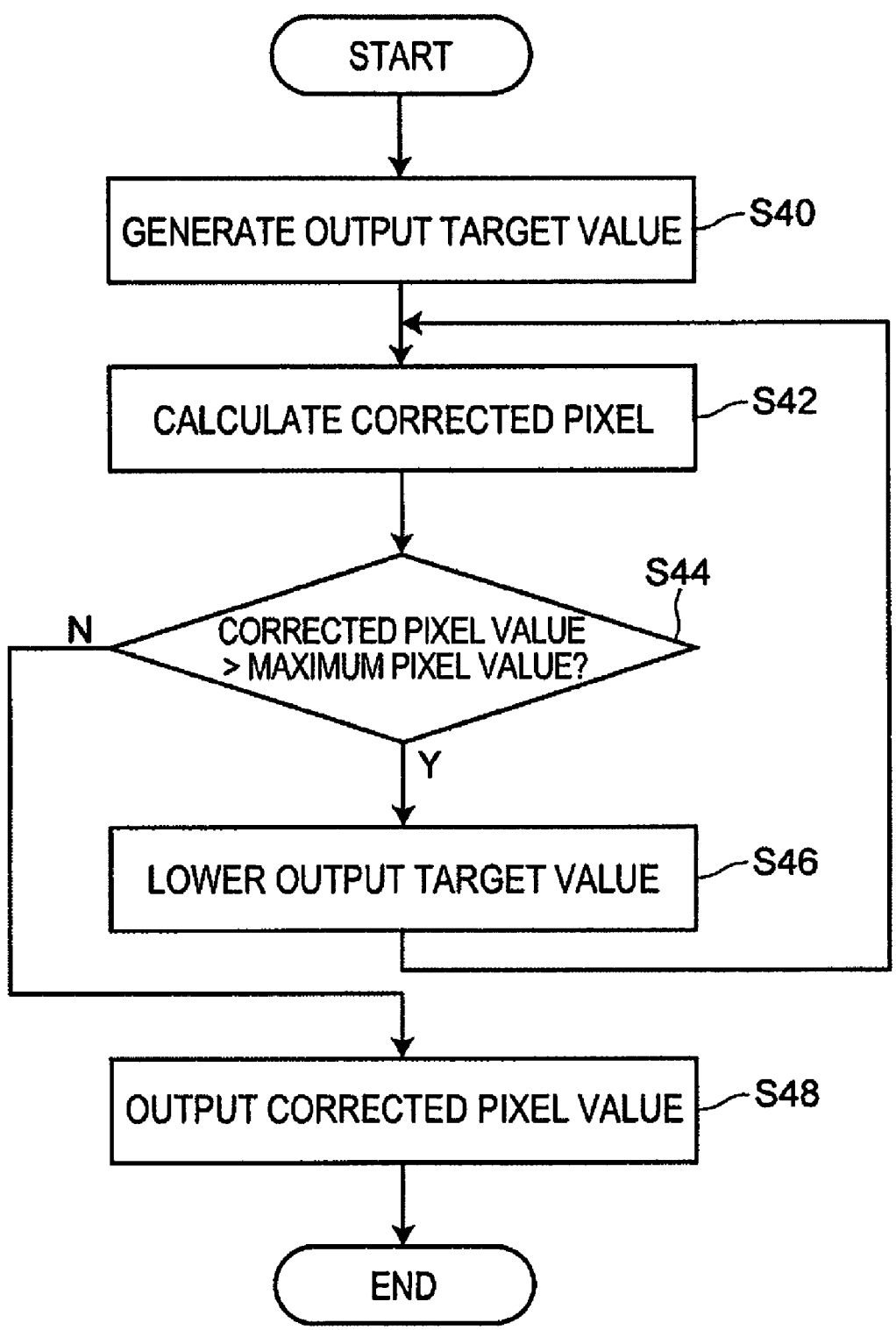
FIG. 11 is a flowchart of an example of the processes for correcting each color component shown in FIG. 10.

FIG. 11 is a flowchart of an example of the processes for correcting each color component shown in FIG. 10. Processes common to color components shown in FIG. 11 are carried out in FIG. 10.

For example, the ROM 82 stores in advance a program for carrying out the processes shown in FIG. 11. The image processing circuit 88 including the CPU 80 or a CPU (not shown) reads the program stored in the ROM 82 and carries out processes that correspond to the program. In this way, the processes shown in FIG. 11 can be carried out by software.

In FIG. 10, the image processing apparatus 100 first acquires an image signal, as an input value, from the image input unit 40, such as the scanner 42 (step S10). The image signal carries, for example, a pixel value for each color component in the RGB space.

The image processing apparatus 100 then corrects the pixel value of the pixel of interest for the B component in the RGB space in the correction amount generator 110 and the correction amount adjuster 120 (step S12).

In the process for correcting the pixel value for the B component, as shown in FIG. 11, the output target value generator 112 generates an output target value of the pixel of interest for the B component (step S40). More specifically, the output target value generator 112 generates, as an output target value function, correction data determined from reference correction values in the present embodiment from the groups of correction data stored in the correction data table 130, and determines, from the output target value function, correction data as the output target value when the same pixel value as the pixel value of the pixel of interest is the input pixel value.

Figure 12:
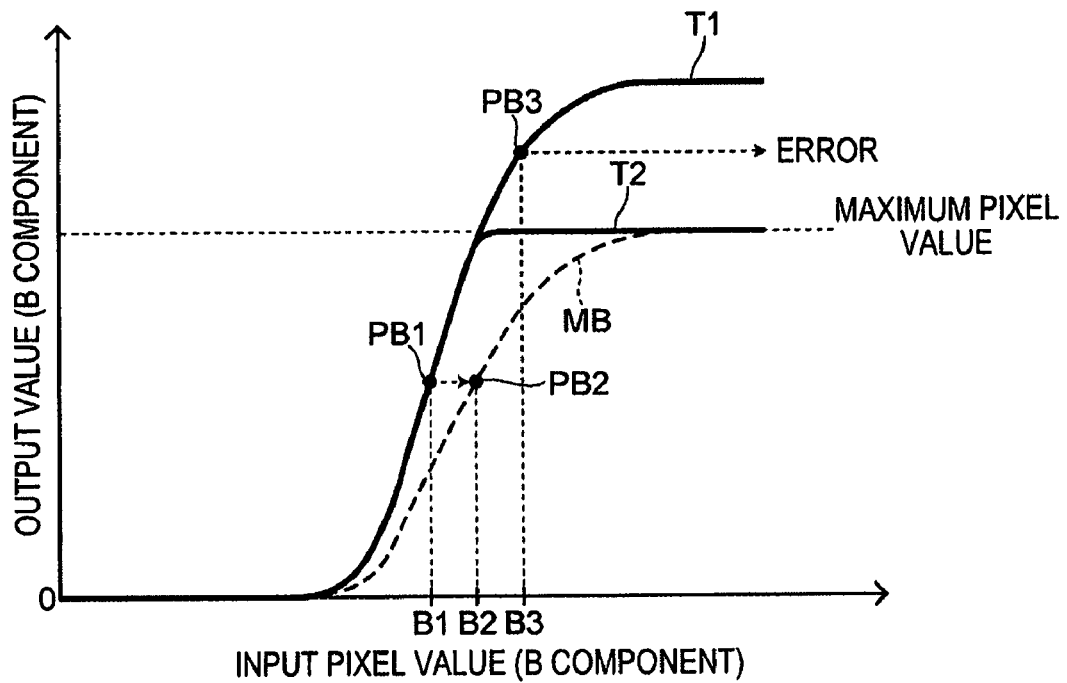
FIG. 12 explains an output target value function for the B component in the present embodiment.

FIG. 12 explains the output target value function for the B component in the present embodiment.

In FIG. 12, the horizontal axis represents the input pixel value for the B component, and the vertical axis represents the output value (correction data, measured value, physical quantity) that corresponds to the output pixel value for the B component. FIG. 12 shows the change in the output pixel value corrected by correction data determined from a correction reference value when an input pixel value is provided. More specifically, in FIG. 12, the output target value function T1 represents correction data determined from a reference correction value in the present embodiment, and the function MB represents correction data for the pixel of interest.

Subsequent to the step S40 in FIG. 11, the correction amount generator 110 determines the amount of correction based on the measured value and the pixel value of the pixel of interest, and determines a corrected pixel value by correcting the pixel value of the pixel of interest based on the amount of correction (step S42). For example, when an input pixel value B1 is provided in FIG. 12, an input pixel value B2 for obtaining output target values (PB1, PB2) that correspond to the input pixel value B1 at the pixel of interest is determined. The amount of correction is thus determined by the difference between the pixel values B1 and B2.

On the other hand, for example, when an input pixel value B3 is provided in FIG. 12, an output target value (PB3) that corresponds to the input pixel value B3 at the pixel of interest is not present on the function MB. That is, searching the correction data table 130 for correction data for the input pixel value B3 of the pixel of interest will not provide any output value but only lead to table search error, because the corrected pixel value obtained by correcting the input pixel value is larger than the maximum pixel value and in the range of displayable values in the image output unit 96. To address the problem, when the corrected pixel value is larger than the maximum pixel value, the amount of correction is adjusted in such a way that the corrected pixel value does not become larger than the maximum pixel value.

To this end, subsequent to the step S42 in FIG. 11, the correction amount adjuster 120 compares the corrected pixel value determined in the step S42 with the maximum pixel value (step S44). When the corrected pixel value is larger than the maximum pixel value (step S44: Y), the correction amount adjuster 120 instructs the output target value generator 112 to lower the output target value produced in the step S40 (step S46), and the control returns to the step S42. The step S46 is carried out so that output target values are on the function T2 shown in FIG. 12. In the step S42, the amount of correction is determined based on the lowered output target value and the pixel value of the pixel of interest, and an corrected pixel value is determined by correcting the pixel value of the pixel of interest based on the amount of correction.

The procedure described above is repeated until the corrected pixel value becomes smaller than or equal to the maximum pixel value in the step S44. When the corrected pixel value becomes smaller than or equal to the maximum pixel value (step S44: N), the image processing apparatus 100 outputs the corrected pixel value obtained by using the amount of correction determined in the correction amount adjuster 120 to correct the pixel value of the pixel of interest (step S48). The series of processes are thus terminated (END).

Referring back to FIG. 10, subsequent to the step S12, the image processing apparatus 100, when it has lowered the output target value for the B component (step S14: Y), acquires a lowering rate rb for the output target value for the B component at the point when the corrected pixel value becomes smaller than or equal to the maximum pixel value in the step S44 in FIG. 11 (step S16). The image processing apparatus 100 then uses the lowering rate rb to calculate output target values for the R and G components, which are the other color components of the pixel of interest (step S18).

The image processing apparatus 100, when it has not lowered the output target value for the B component in the step S14 (step S14: N), uses an output target value for the R component of the pixel of interest as it is to correct the R component (step S20) On the other hand, the image processing apparatus 100, when it has lowered the output target value for the B component in the step S19 (step S14: Y), uses the lowered output target value obtained by using the lowering rate rb for the output target value for the B component to correct the R component (step S20). The lowered output target value is obtained by multiplying the output target value Tr for the R component of the pixel of interest by rb, that is, Tr×rb.

Since the processes for correcting the R component in the step S20 are the same as those for the B component in the step S12, no detailed description of the processes carried out in the step S20 will be made. That is, the processes in the step S20 are carried out as shown in FIG. 11.

Figure 13:
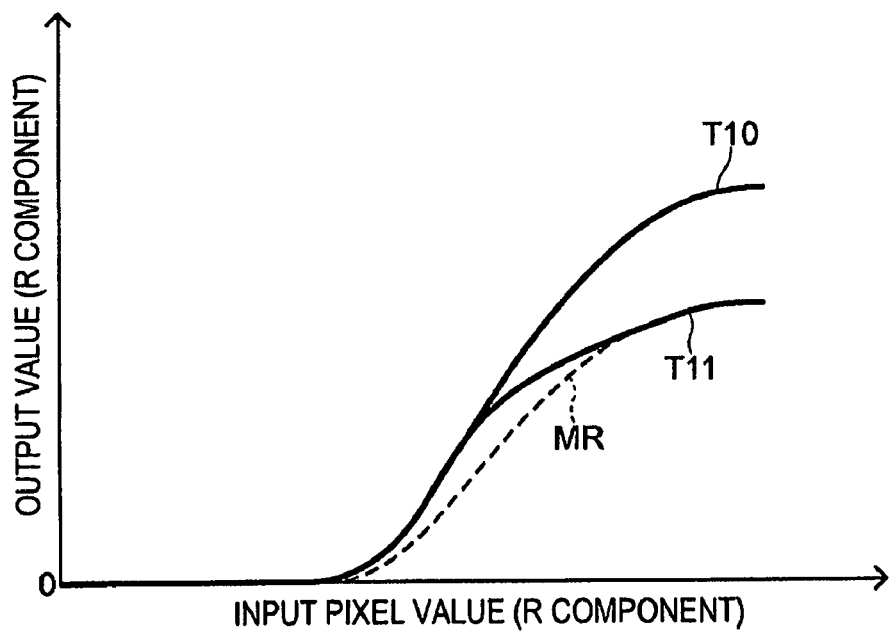
FIG. 13 explains an output target value function for the R component in the present embodiment.

FIG. 13 explains an output target value function for the R component in the present embodiment.

In FIG. 13, as in FIG. 12, the horizontal axis represents the input pixel value for the R component, and the vertical axis represents the output value (correction data, measured value, physical quantity) that corresponds to the output pixel value for the R component. FIG. 13 shows the change in the output pixel value corrected by correction data determined from a correction reference value when an input pixel value is provided. More specifically, in FIG. 13, the output target value function T10 represents correction data determined from a reference correction value in the present embodiment, and the function MR represents correction data for the pixel of interest. FIG. 13 shows an example of output target values for the R component when the output target value for the B component is lowered in the step S12. For the R component as well, output target values lowered at lowering rates rr are on the function T11 shown in FIG. 13.

Referring back to FIG. 10, subsequent to the step S20, the image processing apparatus 100, when it has lowered the output target value for the R component (step S22: Y), acquires a lowering rate rr for the output target value for the R component at the point when the corrected pixel value becomes smaller than or equal to the maximum pixel value as in the step S16 (step S24). The image processing apparatus 100 then uses the lowering rate rr to calculate output target values for the B and G components r which are the other color components of the pixel of interest (step S26).

When the output target value for the B component calculated in the step S26 differs from the output target value used in the step S12 (step S28: Y), the control returns to the step S12, and the output target value for the B component determined in the step S26 is used to sequentially correct the components again by starting from the B component.

When the output target value for the B component calculated in the step S26 is the same as the output target value used in the step S12 (step S28: N), or when the output target value for the R component has not been lowered in the step S22 (step S22: N), the image processing apparatus 100 uses an output target value for the G component of the pixel of interest, or the lowered output target value determined in the step S18 or the step S26 to correct the G component (step S30). The lowered output target value, when the output target value for the B component has been lowered, is obtained by multiplying the output target value Tg for the G component of the pixel of interest calculated in the step S18 by rb, that is, Tg×rb, and further multiplying Tg×rb by rr, that is, Tg×rb×rr, whereas when the output target value for the B component has not been lowered, the lowered output target value is obtained by multiplying the output target value Tg for the G component of the pixel of interest by rr, that is Tg×rr.

Since the processes for correcting the G component in the step S30 are the same as those for the B component in the step S12, no detailed description of the processes carried out in the step S30 will be made. That is, the processes in the step S30 are carried out as shown in FIG. 11.

Figure 14:
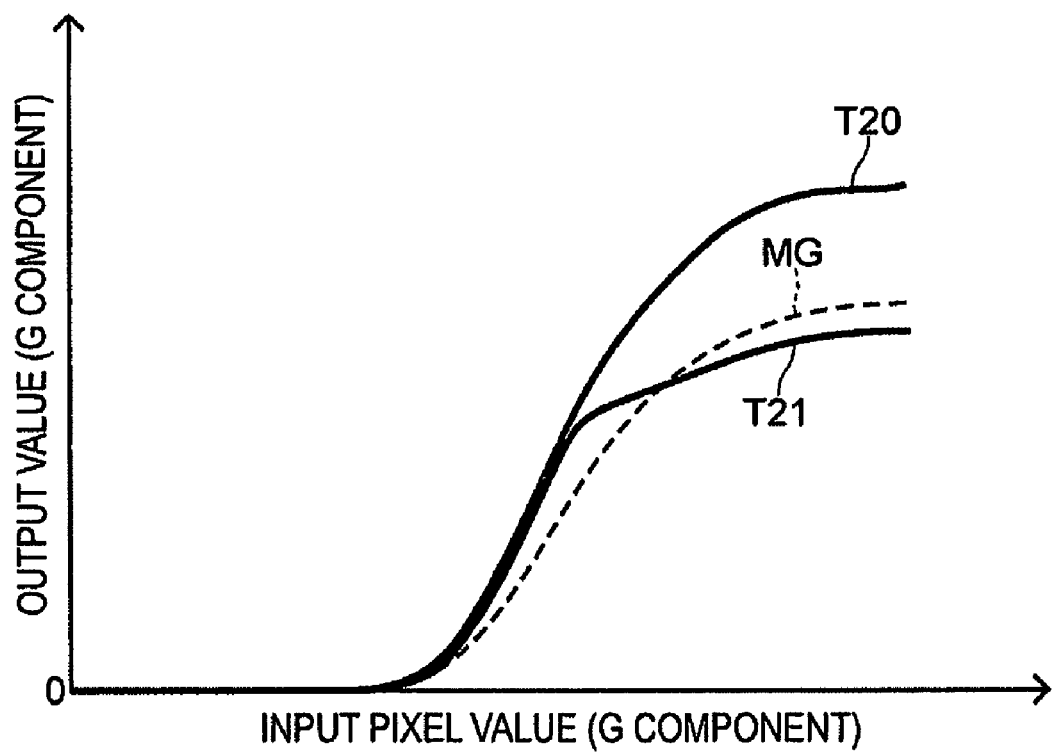
FIG. 14 explains an output target value function for the G component in the present embodiment.

FIG. 14 explains an output target value function for the G component in the present embodiment.

In FIG. 14, as in FIG. 12, the horizontal axis represents the input pixel value for the G component, and the vertical axis represents the output value (correction data, measured value, physical quantity) that corresponds to the output pixel value for the G component. FIG. 14 shows the change in the output pixel value corrected by correction data determined from a correction reference value when an input pixel value is provided. More specifically, in FIG. 14, the output target value function T20 represents correction data determined from a reference correction value described above, and the function MG represents correction data for a pixel of interest. FIG. 14 shows an example of output target values for the G component when the output target values for the B and R components are lowered in the step S12 and S20. For the G component as well, output target values lowered at lowering rates rg are on the function T21 shown in FIG. 14.

Referring back to FIG. 10, subsequent to the step S30, the image processing apparatus 100, when it has lowered the output target value for the G component (step S32: Y), acquires a lowering rate rg for the output target value for the G component at the point when the corrected pixel value becomes smaller than or equal to the maximum pixel value as in the step S16 (step S34). The image processing apparatus 100 then uses the lowering rate rg to calculate output target values for the B and R components, which are the other color components of the pixel of interest (step S36).

When the output target value for the B component calculated in the step S36 differs from the output target value used in the step S12, or the output target value for the R component calculated in the step S36 differs from the output target value used in the step S20 (step S38: Y), the control returns to the step S12, and the output target value for the B component determined in the step S36 is used to sequentially correct the components again by starting from the B component.

When the output target value for the B component calculated in the step S36 is the same as the output target value used in the step S12, and the output target value for the R component calculated in the step S36 is the same as the output target value used in the step S20 (step S38: N), or when the output target value for the G component has not been lowered in the step S32 (step S32: N), the image processing apparatus 100 judges whether or not all the pixels have been corrected (step S39).

When all the pixels in the image have been corrected (step S39: Y), the image processing apparatus 100 terminates the series of processes (END), whereas when all the pixels in the image have not yet been corrected (step S39: N), the control returns to the step S10.

As described above, in the present embodiment, a corrected pixel value is determined by lowering an output target value for each color component, and the output target value is updated in accordance with the lowering rate of the output target value. Whenever the output target value is changed, the changed output target value is used to sequentially correct the color components by starting from the first one, whereby the output target values for the color components are finally lowered at the same rate.

As described above, the image processing apparatus 100 (correction amount adjuster 120) can adjust the amount of correction in such a way that a corrected pixel value for each color component in the RGB color space does not exceed a maximum pixel value. The amount of correction can thus be adjusted in such a way that the u' and v' components of a pixel of interest in the u'-v' chromaticity diagram coincide with the u' and v' components determined from reference correction values in the present embodiment.

Figure 15:
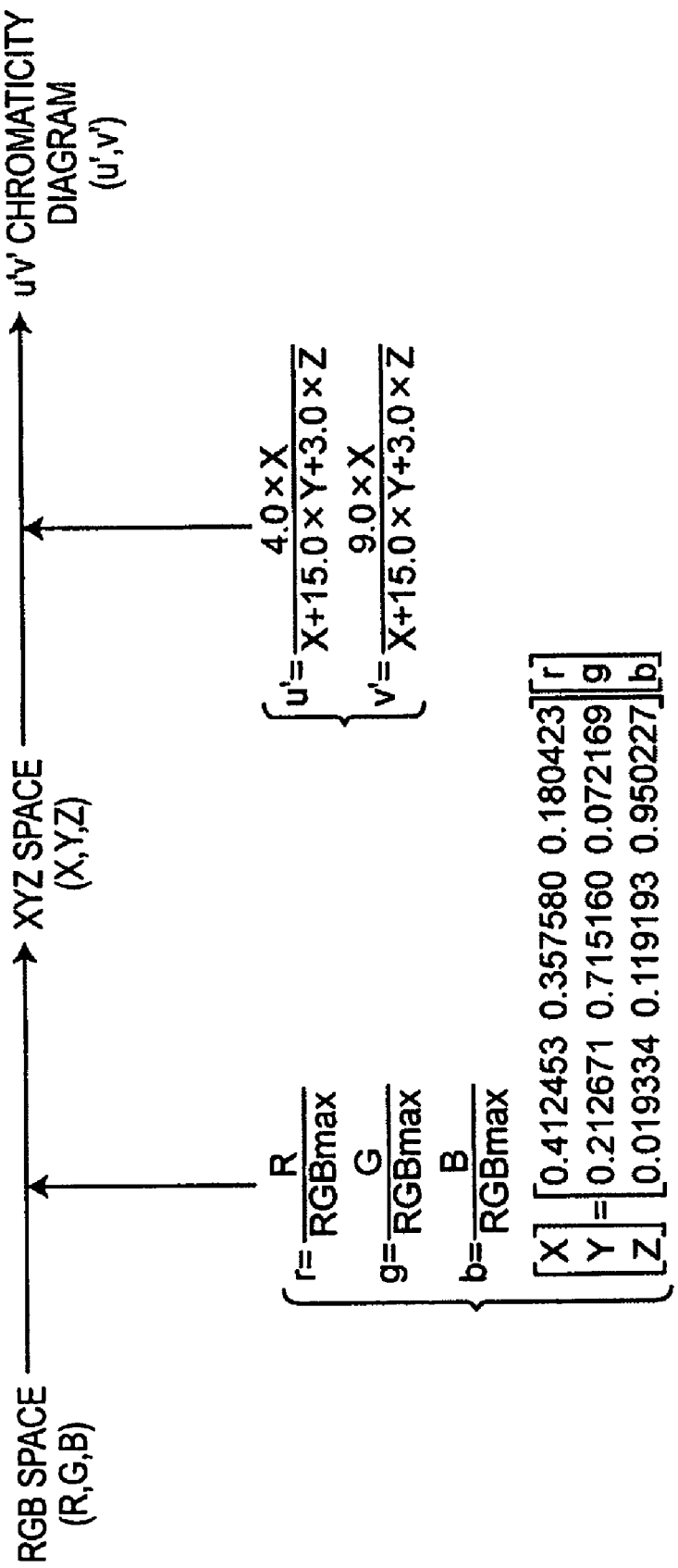
FIG. 15 explains processes for converting a pixel value in the RGB space into the u' and v' components in the u'-v' chromaticity diagram.

FIG. 15 explains processes for converting a pixel value in the RGB space into the u' and v' components in the u'-v' chromaticity diagram.

In FIG. 15, let R be a pixel value for the R component in the ROB space, G be a pixel value for the G component, B be a pixel value for the B component, and RGBmax be a maximum pixel value.

A series of conversion equations shown in FIG. 15 can be used to convert the pixel value of a pixel in the RGB space into the pixel value in the XYZ space (CIE 1964 colorimetric system). The series of conversion equations shown in FIG. 15 can further be used to convert the pixel value in the XYZ space into the u' and v' components in the u'-v' chromaticity diagram (CIE 1976 UCS chromaticity diagram). In the u'-v' chromaticity diagram, the u' and v' components represent hue and chroma.

In the present embodiment, when a corrected pixel value exceeds a maximum pixel value as described above, lowered output target values obtained by lowering output target values for the color components in the RGB color space at the same rate are used. Therefore, when corrected pixel values of the pixel of interest are made equal to correction data, which are output target values, determined from correction reference values in the present embodiment, the variables r, g, b and the components X and Y shown in FIG. 15 are lowered at the same rate. Therefore, since the u' and v' components can be fixed, the hue and chroma of the pixel of interest can coincide with the hue and chroma determined from correction reference values in the present embodiment within the range in which the corrected pixel values do not exceed the maximum pixel value.

Further, since the components are lowered at the same rate, performing the correction operation three times at maximum, which is the number of RGB color components, can always complete the correction processes in such a way that corrected pixel values for the RGB color components do not exceed the maximum pixel value.

4. Others

In the embodiment described above, the image correction apparatus 200 employs, as the correction reference value, the average of measured values of all the pixels in L images projected by the first projector PJ1 to the L-th projector PJL, but the invention is not limited thereto.

Figure 16:
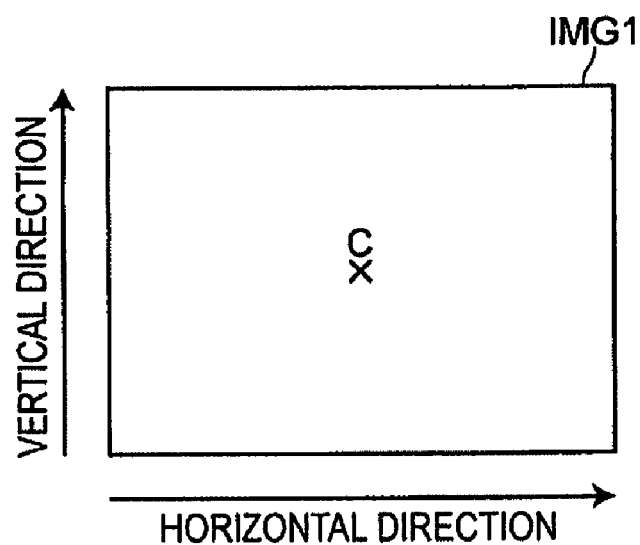
FIG. 16 explains a correction reference value in a first variation of the present embodiment.

FIG. 16 explains a correction reference value in a first variation of the present embodiment.

FIG. 16 shows a pixel C at a representative point in an image IMG1 projected by a single projector. In the first variation, the image correction apparatus 200 determines, as a correction reference value, the average of measured values of the pixel C at a representative point in L images projected by the first projector PJ1 to the L-th projector PJL. In this way, the processes carried out by the image correction apparatus 200 can be significantly simplified. As the pixel C at a representative point in an image, the central pixel in the image IMG1 can be employed. In general, since the central pixel has the highest brightness, reduction in contrast due to correction can be avoided by using the average of measured values of the central pixel in the projectors as a correction reference value.

Figure 17:
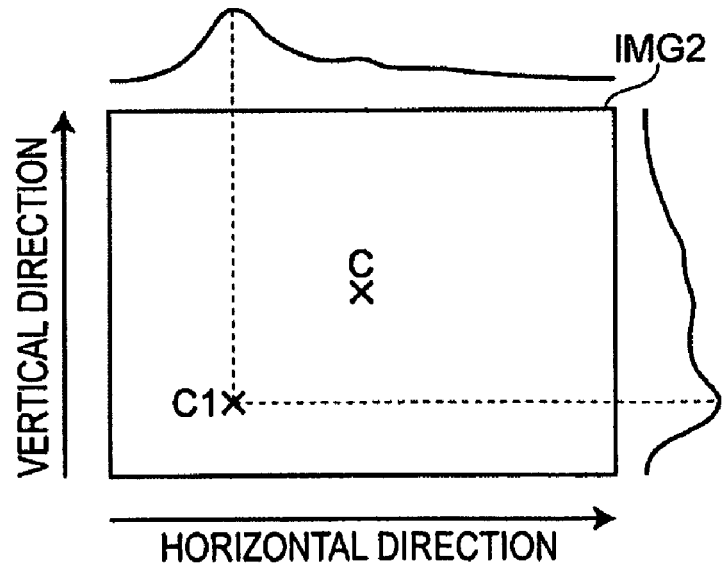
FIG. 17 explains a correction reference value in a second variation of the present embodiment.

FIG. 17 explains a correction reference value in a second variation of the present embodiment.

FIG. 17 diagrammatically shows the brightness distribution along a horizontal line on which the brightest pixel is located and the brightness distribution along a vertical line on which the same brightest pixel is located in an image IG2 projected by a single projector. In the second variation, the image correction apparatus 200 employs, as a representative point, the brightest pixel C1 in each of L images projected by the first projector PJ1 to the L-th projector PJL, and determines, as a correction reference value, the average of measured value of the brightest pixel C1 in the images. In this way, the processes carried out by the image correction apparatus 200 can be significantly simplified. Further, reduction in contrast due to correction can be reliably avoided by using the average of the measured value of the brightest pixel in the projectors as a correction reference value, as compared to a case where the average of measured values of the central pixel is used as a correction reference value.

Figure 18:
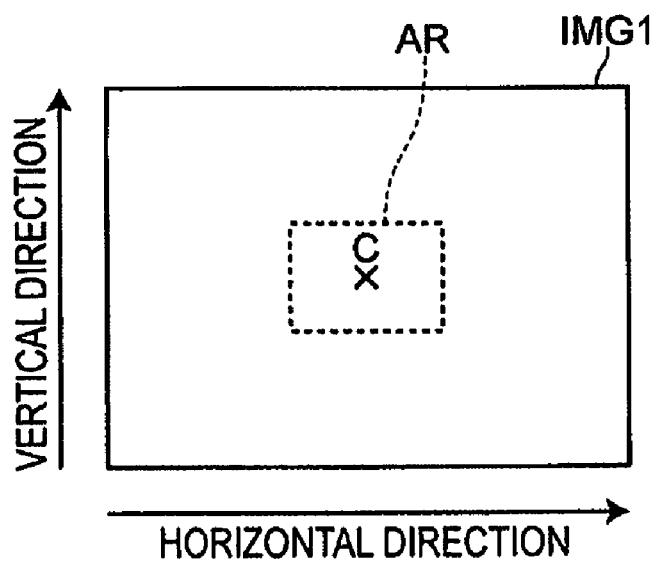
FIG. 18 explains a correction reference value in a third variation of the present embodiment.

FIG. 18 explains a correction reference value in a third variation of the present embodiment. In FIG. 18, the same portions as those in FIG. 16 have the same reference characters and description thereof will be omitted as appropriate.

FIG. 18 shows a predetermined area AR containing a pixel C at a representative point in an image IMG1 projected by a single projector (the central pixel in the image IMG1, for example). In the third variation, the average of measured values of the pixels in the area AR is determined as a correction reference value. The area AR can be simply specified by using an area centered around the pixel C as the area ARK. Further, using the average of measured values of the pixels in the area centered around the central pixel as a correction reference value allows reduction in influence of measurement noise, for example, produced when there are dust particles in the measurement process or defective pixels, and when the central pixel is located in a black matrix between pixels, as compared to a case where the average of measured values of the central pixel is used as a correction reference value.

Figure 19:
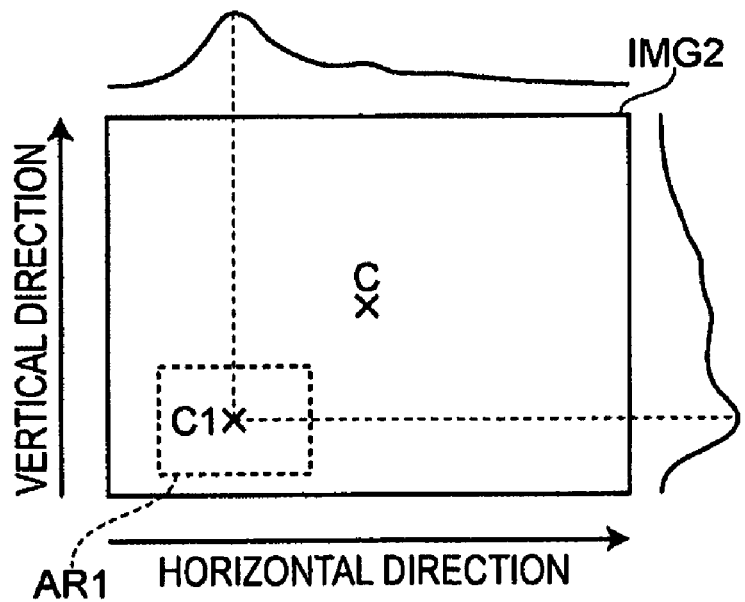
FIG. 19 explains a correction reference value in a fourth variation of the present embodiment.

FIG. 19 explains a correction reference value in a fourth variation of the present embodiment. In FIG. 19, the same portions as those in FIG. 17 have the same reference characters and description thereof will be omitted as appropriate.

FIG. 19 shows a predetermined area AR1 containing the brightest pixel C1 in an image IMG2 projected by a single projector. In the fourth variation, the average of measured values of the pixels in the area AR1 is determined as reference correction. The area AR1 can be simply specified by using an area centered around the pixel C1 as the area AR1. Further, using the average of measured values of the pixels in the area centered around the brightest pixel C1 as a correction reference value allows reduction in influence of measurement noise, for example, produced when there are dust particles in the measurement process or defective pixels, as compared to a case where the average of measured values of the pixel C1 is used as a correction reference value.

While the image correction apparatus, the image display system, and the image correction method according to embodiments of the invention have been described with reference to the above respective embodiments, the invention is not limited thereto, but can be implemented in a variety of aspects to the extent these aspects do not depart from the spirit of the invention. For example, the following variations are also possible.

1. In the above embodiments, when a corrected pixel value for each color component in the RGB space exceeds a maximum pixel value, the B, R, and G components are processed in this order, but the invention is not limited by the order of processing color components.

2. The above embodiments have been described with reference to the case where the correction data table stores correction data that correspond to measured pixel values of all pixels in an image, but the invention is not limited thereto. For example, the correction data table may only store correction data that correspond to measured values of predetermined pixel values for predetermined pixels in a discrete manner, and correction data for pixels that are not stored in the correction data table may be determined by means of a known data interpolation method using the correction data stored in the correction data table. In this case, the storage capacity of the correction data table can be advantageously reduced.

3. In the above embodiments, the display characteristics of a projector is obtained by acquiring the pixel values of the pixels in an image projected by the projector, but the invention is not limited thereto.

4. The above embodiments have been described with reference to a projector, but the invention is not limited thereto. For example, general image display apparatus, such as a liquid crystal display apparatus, a plasma display apparatus, and an organic EL display apparatus, are applicable to the image display apparatus according to an embodiment of the invention.

5. In the above embodiments, the invention has been described as the image correction apparatus, the image display system, and the image correction method, but the invention is not limited thereto. For example, the invention may provide a program in which a process procedure of an image correction method for implementing the invention is written and a recording medium on which the program is recorded.

What is claimed is:

1. An image correction apparatus that corrects images displayed by a plurality of image display apparatus, the images arranged contiguously or superimposed, the image correction apparatus comprising:
    a correction reference value generator that generates a correction reference value, the correction reference value being a reference display characteristic common to each of the plurality of image display apparatus, and the correction reference value being generated based on display characteristics of the plurality of image display apparatus;
    a correction data generator that generates correction data for each of the image display apparatus, the correction data used to correct pixel values in such a way that the display characteristic of each of the image display apparatus using the corrected pixel values is equivalent to the correction reference value; and
    a correction amount adjuster that adjusts an amount of correction in such a way that, when the corrected pixel values obtained by using the amount of correction to correct the pixel values are larger than a given maximum pixel value, a hue and chroma of the pixels that correspond to the corrected pixel values coincide with a hue and chroma determined from the correction reference value and the corrected pixel values are smaller than or equal to the maximum pixel value.

2. The image correction apparatus according to claim 1, wherein the correction reference value generator generates the correction reference value for each grayscale.

3. The image correction apparatus according to claim 1, wherein the correction reference value is the average of pixel values in the central positions in images displayed by the plurality of image correction apparatus.

4. An image display system that displays a plurality of images arranged contiguously or superimposed, the image display system comprising:
    the image correction apparatus according to claim 1, and
    a plurality of image display apparatus that display the plurality of images based on corrected pixel values obtained by using correction data generated by the image correction apparatus to correct the pixel values.

5. The image display system according to claim 4, wherein:
    each of the image display apparatus includes:
        an image processing apparatus that adjusts the amount of correction used to correct the pixel values, and
    the image processing apparatus includes:
        a correction amount generator that generates the amount of correction that corresponds to the pixel values.

6. The image display system according to claim 5, wherein the correction amount adjuster adjusts the amount of correction in such a way that when the corrected pixel value is larger than the maximum pixel value, the u' and v' components of the pixel in the u'-v' chromaticity diagram coincide with the u' and v' components determined from the correction reference value.

7. An image correction method for correcting images displayed by a plurality of image display apparatus, the images arranged contiguously or superimposed, the image correction method comprising:
    generating a correction reference value, the correction reference value being a reference display characteristic common to each of the plurality of image display apparatus, and the correction reference value being generated based on display characteristics of the plurality of image display apparatus;
    generating correction data for each of the image display apparatus, the correction data used to correct a pixel value in such a way that the display characteristic of the image display apparatus using the corrected pixel value is equivalent to the correction reference value; and
    adjusting an amount of correction in such a way that, when the corrected pixel values obtained by using the amount of correction to correct the pixel values are larger than a given maximum pixel value, a hue and chroma of the pixels that correspond to the corrected pixel values coincide with a hue and chroma determined from the correction reference value and the corrected pixel values are smaller than or equal to the maximum pixel value.

* * * * *